(12) United States Patent
Shuttleworth et al.

(10) Patent No.: US 7,296,675 B1
(45) Date of Patent: Nov. 20, 2007

(54) MAGNETIC CENTERING ROLLER FOR REINFORCE CONVEYOR BELTS

(75) Inventors: Timothy G Shuttleworth, Girard, PA (US); Marshall A. Carner, Erie, PA (US)

(73) Assignee: Eriez Magnetics, Erie, PA (US)

( * ) Notice: Subject to any disclaimer, the term of this patent is extended or adjusted under 35 U.S.C. 154(b) by 0 days.

(21) Appl. No.: 11/638,600

(22) Filed: Dec. 12, 2006

(51) Int. Cl.
    *B65G 15/60* (2006.01)
(52) U.S. Cl. .................................. 198/805; 198/690.1
(58) Field of Classification Search ............... 198/805, 198/835, 818, 690.1, 823, 824
    See application file for complete search history.

(56) References Cited

U.S. PATENT DOCUMENTS

| | | | | |
|---|---|---|---|---|
| 2,684,753 | A | * | 7/1954 | Kolbe et al. ................. 198/805 |
| 4,623,061 | A | * | 11/1986 | Pentith ........................ 198/805 |
| 5,036,969 | A | * | 8/1991 | Garbagnati .................. 198/805 |
| 5,865,298 | A | * | 2/1999 | Furlani et al. .............. 198/805 |
| 6,510,941 | B2 | * | 1/2003 | Schermutzki et al. ..... 198/836.1 |

* cited by examiner

*Primary Examiner*—James R. Bidwell
(74) *Attorney, Agent, or Firm*—Richard K Thomson

(57) ABSTRACT

A centering roller which is used with reinforced conveyor belts has permanent magnets within its outer shell to attract the steel cables used to reinforce the lateral portions of the belt. Preferably, the permanent magnets are of the rare earth variety to provide increased magnetic attraction and ensure centering of the belt.

15 Claims, 3 Drawing Sheets

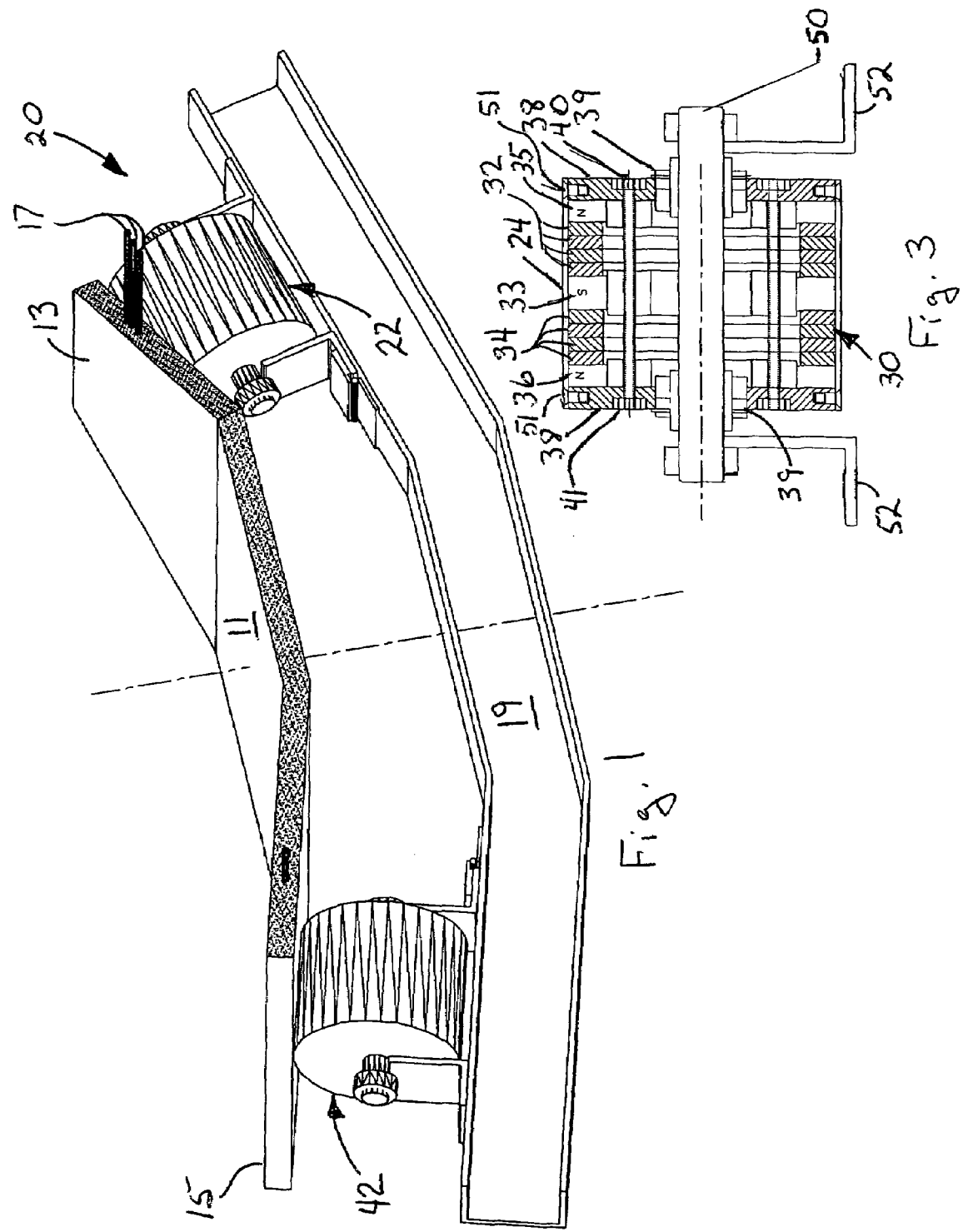

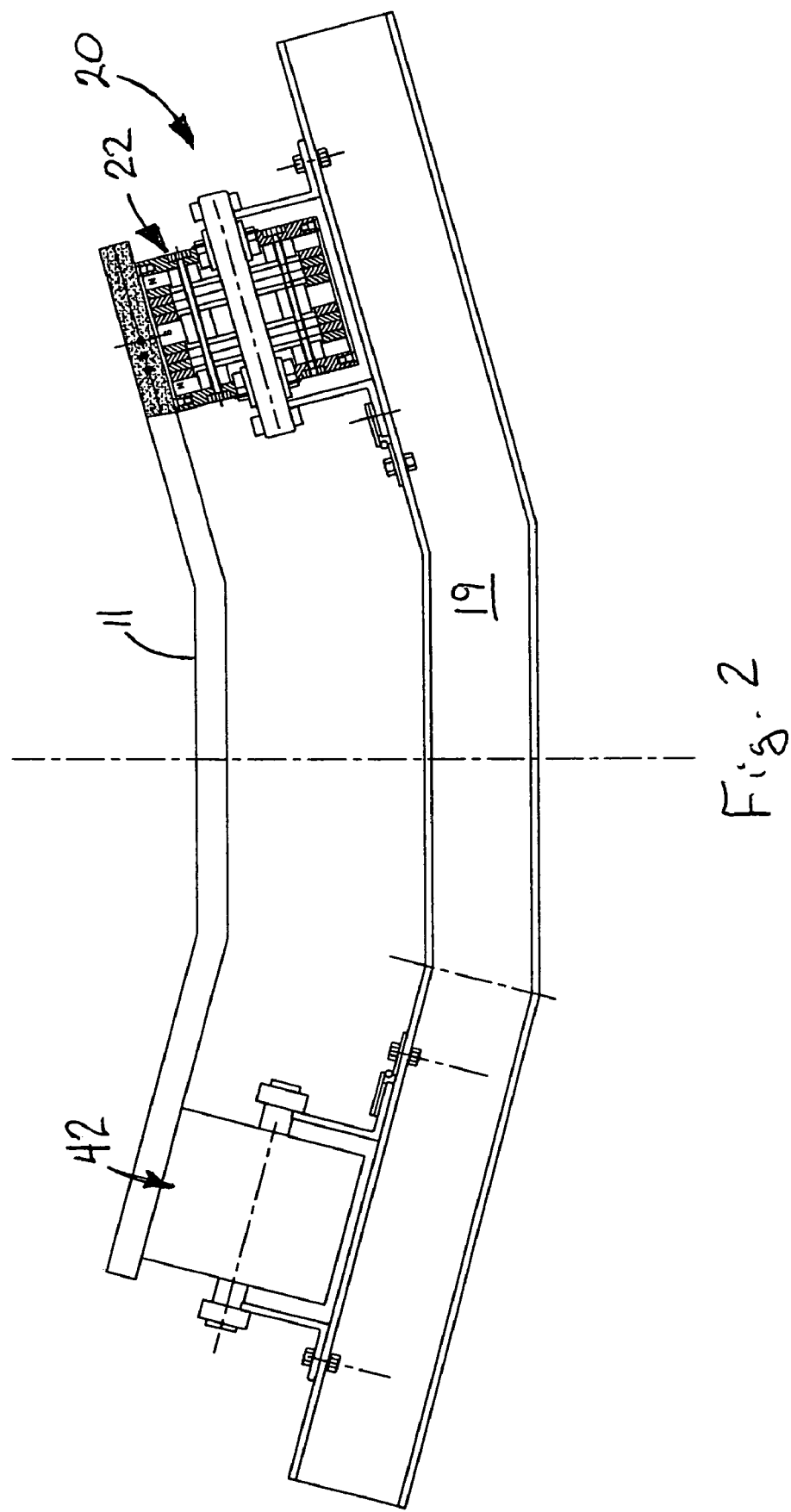

MAGNETIC CENTERING ROLLER FOR REINFORCE CONVEYOR BELTS

BACKGROUND AND SUMMARY OF THE INVENTION

The present invention is directed to the field of conveyors, specifically belt conveyors. More particularly, the present invention is directed to a magnetic support roller for use in centering reinforced conveyor belts.

Preventing conveyor belts from "walking off" the drive and return drums and the intervening support rollers can be problematic. This can be particularly difficult for conveyor systems which are not prone to being centered by conventional means and which are routinely reversed. These centering problems are exacerbated for conveyor systems having short runs, i.e., where the drive roll and return roll are located close together. Having the loaded belt run high on the support rollers can not only potentially damage the belt but risk spillage of the conveyed load, as well. This difficulty can manifest itself when a lengthy conveyor belt is under load, or when running empty; in the latter case, particularly on the return run. Attempts have been made to remedy this problem by contacting the edges of the belt with stationary guide rails or rotating rollers. In either case, contacting the edge of the belt with something, whether stationary or in motion, can abrade the belt causing wear damage.

Reinforced conveyor belts have steel cord in at least one lateral portion and, in most cases, both sides of the belt. These steel cords are susceptible to magnetic forces if the strength of the magnetic field is sufficient. The advent of rare-earth magnets provides an opportunity to provide a return roller with adequate magnetic field strength to influence the positioning of the belt so as to prevent this "walking off" problem. In some applications, conventional magnets have adequate force to accomplish the task. Further, in many cases, it is not necessary that each support or return roller have the magnet therein. Often, only every $3^{rd}$ or $4^{th}$ roller needs to be magnetized in order to provide a system for maintaining the belt centered on the rollers.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which FIG. 1 is a perspective front view of a first embodiment of the of the present invention;

FIG. 2 is a front view of the first embodiment with one of the rollers in section;

FIG. 3 is a detailed front view of one of the rollers of the first embodiment shown in partial section; and, FIG. 4 is a front view of a return roller depicted beneath a load-bearing belt employing the features of the present invention.

DETAILED DESCRIPTION OF THE PREFERRED EMBODIMENT(S)

Figure 4:
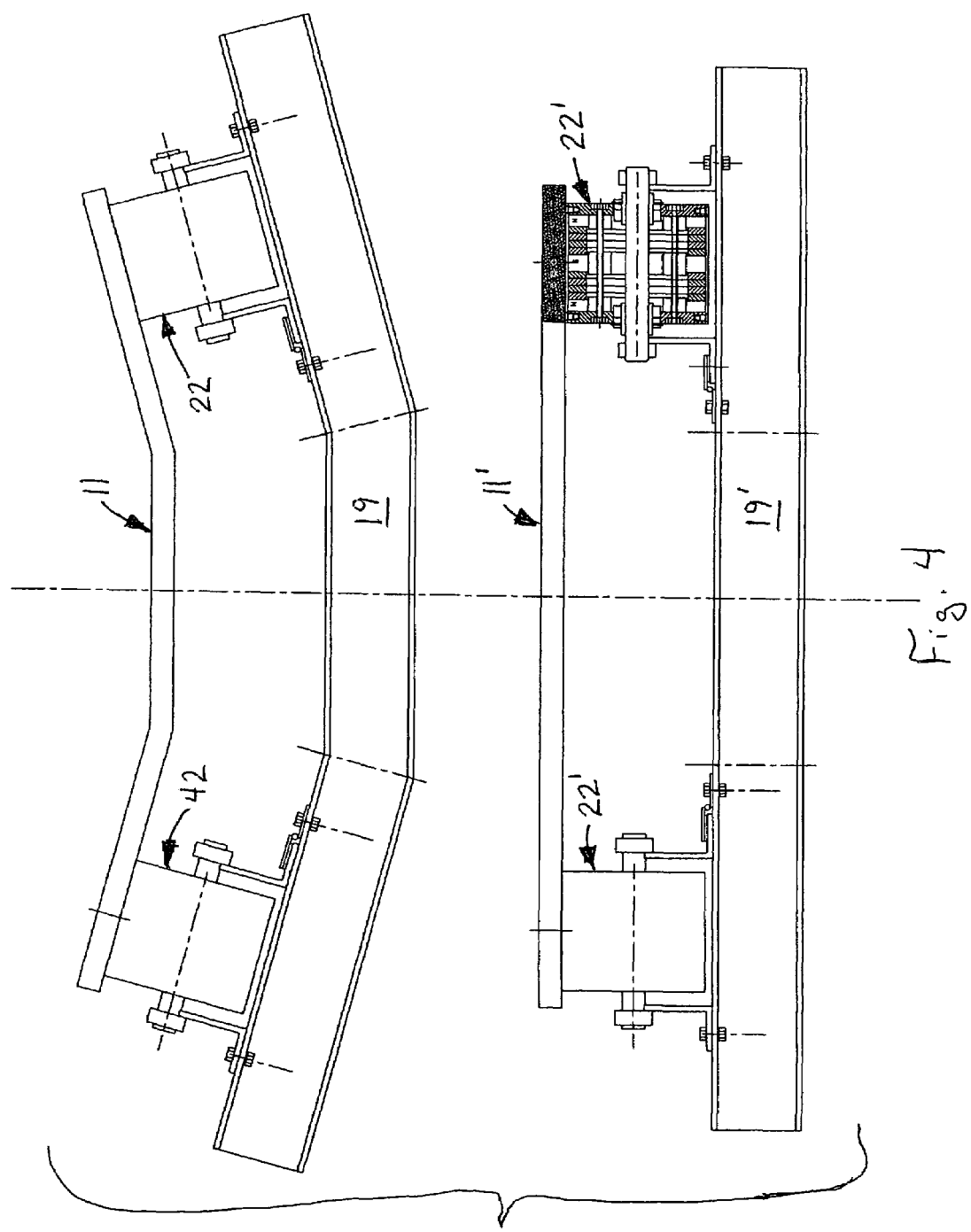

A first embodiment of the support roller assembly of the present invention is depicted in FIGS. 1 and 2 generally at 20. Support roller assembly 20 has a first roller 22 and a second identical roller 42 which underlie first edge 13 and second edge 15, respectively, of conveyor belt 11. Typically, conveyor belt 11 is reinforced along each edge by means having some capacity for being influenced by a magnetic field. Within the context of this specification, the phrase having magnetic properties will refer to this capacity to be magnetically influenced. In most cases, the reinforcement means comprises one or more steel cables 17 (three being shown) embedded in each edge 13, 15 of the elastomeric body of belt 11.

The details of roller 22 (and identical roller 42) are best seen in FIGS. 2 and 3. Roller 22 comprises a cylindrical sleeve 24 which forms a shell that houses at least one permanent magnet 30. While conventional magnets will be acceptable for some applications, it is preferred that the permanent magnets be rare earth magnets because of their superior magnetic strength. As depicted in FIGS. 2 and 3, permanent magnet 30 comprises two stacks of rare earth magnetic plates 32, 34 which sandwich, and are adhesively bonded to, inner pole disk 33. Outer pole disks 35, 36 are also adhesively bonded to an exterior portion of plate stacks 32, 34, respectively, and held in place by end flanges 38. Preferably, both sleeve 22 and end flanges 38 are made of non-magnetic materials. End flanges 38 are mounted on bearings 39 which rotate on shaft 50. A total of six (two shown) bolts 40 extend through the ordered array defined by the rare earth magnetic plates 32, 34, the pole disks 33, 35, 36 and end flanges 38 and are secured by hex nuts 41. Both the heads of bolts 40 and the hex nuts 41 are countersunk into their respective end flanges 38. Sleeve 24 is secured to end flanges 38 by a plurality of screws 51. Ends of shaft 50 are mounted on L-brackets 52 which are bolted in place atop the beam 19 (FIG. 1).

The principles of the invention can also be applied to the return run 11' of conveyor belt 11 as seen in FIG. 4. Typically, the support beam 19' will be flat on the return run. First and second magnetic rollers 22' help maintain return run 11' centered and avoid wandering of the conveyor belt. By employing magnets 30 in roller 22, the reinforced conveyor belt 11 is maintained centered for optimum belt wear and load safety. Most preferably, the magnets 30 are of the rare earth variety to provide superior magnetic strength properties. As noted earlier, in certain instances as few as one in three or one in four rollers on the load carrying and return runs need be equipped with magnets to achieve the desired centering of the belt 11. It will be understood that for those belts not having steel cable reinforcement, a "reinforcement" strip of ferrous material can be added externally or internally, to one or both edges of the conveyor belt to enable application of the teachings of this invention.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

We claim:

1. A support roller assembly for a conveyor belt, the conveyor belt having reinforcement means attached thereto adjacent a first edge, the reinforcement means including at least a first strand having magnetic properties, said support roller assembly comprising a) a hollow cylindrical sleeve;
   b) at least one permanent magnet within said cylindrical sleeve;
   c) mounting means to support said cylindrical sleeve beneath the first edge to magnetically attract the at least first strand having magnetic properties to maintain the conveyor belt centered on said support roller assembly.

2. The support roller assembly of claim 1 wherein said at least one permanent magnet comprises a rare earth magnet.

3. The roller support assembly of claim 1 wherein the conveyor belt has at least a second reinforcing strand having magnetic properties adjacent a second edge, said support roller assembly further comprising a second magnetic roller aligned with said first magnetic roller with mounting means positioning said second roller beneath the second edge to attract the at least second strand having magnetic properties to maintain the conveyor belt centered on the support roller assembly.

4. A support roller assembly for a conveyor belt, the conveyor belt being reinforced adjacent a first edge with at least one strand having magnetic properties, said support roller assembly comprising
   a) a plurality of disks, at least a portion of each said disk being a permanent magnet, said plurality of disks being spaced into a plurality of stacks of said permanent magnets thereby defining at least one set of elements having opposing polarity;
   b) first and second end flanges positioned on opposite sides of said plurality of disks;
   c) means securing said first and second end flanges and said plurality of disks in an ordered array;
   d) a cylindrical sleeve forming an outer shell which surrounds said ordered array;
   e) fastener means securing said outer shell in position surrounding said ordered array;
   f) a shaft extending through a center portion of each member of said ordered array;
   g) means rotationally mounting said ordered array for rotation about an axis of said shaft;
   h) support means positioning said guide roller adjacent to an upper or lower surface portion of the at least one edge having at least one strand having magnetic properties in order to exert a magnetic force thereon to maintain the conveyor belt in proper lateral alignment.

5. The support roller assembly of claim 4 wherein said one set of elements comprises three elements total, two outer elements having a first polarity and a center element having an opposite polarity.

6. The support roller assembly of claim 4 wherein said means securing comprises a plurality of bolts extending through each element of said ordered array and being secured in position by a nut.

7. The support roller assembly of claim 5 wherein said means securing further comprises a layer of adhesive securing said plurality of said disks adjacent to said pole elements to said respective pole elements.

8. The support roller assembly of claim 4 wherein said means rotationally mounting comprises first and second rotatable bearings mounted between said shaft and said end flanges.

9. The support roller assembly of claim 4 wherein the conveyor belt comprises an elastomeric belt which is reinforced with at least one strand adjacent each of said first and a second lateral edge, said support roller assembly comprising a second roller adjacent an upper or lower surface of said second edge portion having at least one strand having magnetic properties.

10. The support roller assembly of claim 4 wherein said permanent magnets comprise rare earth magnets.

11. A conveyor assembly comprising
   a) a continuous flexible belt having at least one reinforcing element adjacent a first edge, said reinforcing element containing iron;
   b) a support roller assembly positioned adjacent to an upper or lower surface portion of either an upper load-supporting run or a lower return run, said support roller assembly including
      i) a plurality of disks, at least a portion of each said disk being a permanent magnet, said plurality of disks being spaced into a plurality of stacks of said permanent magnets thereby defining at least one set of elements having opposing polarity;
      ii) first and second end flanges positioned on opposite sides of said plurality of disks;
      iii) means securing said first and second end flanges and said plurality of disks in an ordered array;
      iv) a cylindrical sleeve forming an outer shell which surrounds said ordered array;
      v) fastener means securing said outer shell in position surrounding said ordered array;
      vi) a shaft extending through a center portion of each member of said ordered array;
      vii) means rotationally mounting said ordered array for rotation about an axis of said shaft;
      viii) support means positioning said guide roller adjacent to an upper or lower surface portion of the at least one edge having at least one strand having magnetic properties in order to exert a magnetic force thereon to maintain said conveyor belt in proper lateral alignment.

12. The conveyor assembly of claim 11 wherein said conveyor belt comprises an elastomeric belt having at least one first steel cord embedded adjacent said first edge portion.

13. The conveyor assembly of claim 12 further comprising said elastomeric belt having at least one second steel cord embedded adjacent a second edge portion.

14. The conveyor belt assembly of claim 13 wherein said support roller assembly further comprises a second ordered magnetic array positioned adjacent an upper or lower surface portion adjacent said second edge portion to exert a magnetic force on said second steel cord in order to exert a magnetic force thereon to maintain said conveyor belt in proper lateral alignment.

15. The conveyor belt assembly of claim 11 wherein said permanent magnets comprise rare earth magnets.

* * * * *